United States Patent
Andoh et al.

(10) Patent No.: US 7,377,732 B2
(45) Date of Patent: May 27, 2008

(54) THREAD MILL HAVING FLUTE TWISTING IN DIRECTION OPPOSITE TO ROTATING DIRECTION

(75) Inventors: Haruyasu Andoh, Toyokawa (JP); Takayuki Nakajima, Toyokawa (JP)

(73) Assignee: OSG Corporation, Toyokawa (JP)

( * ) Notice: Subject to any disclaimer, the term of this patent is extended or adjusted under 35 U.S.C. 154(b) by 9 days.

(21) Appl. No.: 11/384,349

(22) Filed: Mar. 21, 2006

(65) Prior Publication Data
US 2006/0233623 A1     Oct. 19, 2006

(30) Foreign Application Priority Data
Apr. 13, 2005   (JP) .............................. 2005-116329

(51) Int. Cl.
*B23G 5/00*     (2006.01)
*B23G 5/06*     (2006.01)
*B23G 5/18*     (2006.01)

(52) U.S. Cl. .......................... 409/74; 409/66; 407/54; 407/24

(58) Field of Classification Search .................. 409/65, 409/66, 67, 68, 74, 75, 76, 77, 78; 407/54, 407/24, 29; 408/218, 219, 220, 222, 226
See application file for complete search history.

(56) References Cited

U.S. PATENT DOCUMENTS

| | | | | |
|---|---|---|---|---|
| 3,251,080 A | * | 5/1966 | Sharon | 408/219 |
| 3,645,642 A | * | 2/1972 | Koslow | 408/202 |
| 4,227,837 A | * | 10/1980 | Yodoshi | 407/53 |
| 4,395,167 A | * | 7/1983 | Maternus | 407/54 |
| 4,651,374 A | * | 3/1987 | Turchan | 409/74 |
| 4,655,650 A | * | 4/1987 | Crawford et al. | 408/225 |
| 4,765,782 A | * | 8/1988 | Ohkita | 407/24 |
| 4,810,136 A | * | 3/1989 | Paige | 407/54 |
| 4,831,674 A | | 5/1989 | Bergström et al. | |
| 4,943,191 A | * | 7/1990 | Schmitt | 408/1 R |
| 5,143,490 A | * | 9/1992 | Kopras | 408/26 |
| 5,226,760 A | * | 7/1993 | Nishimura | 407/54 |
| 5,323,823 A | * | 6/1994 | Kopras | 407/54 |
| 5,413,438 A | * | 5/1995 | Turchan | 409/66 |
| 5,429,459 A | * | 7/1995 | Palm | 409/66 |
| 5,733,078 A | * | 3/1998 | Matsushita et al. | 409/74 |
| 6,000,887 A | * | 12/1999 | Hoefler et al. | 408/230 |

(Continued)

FOREIGN PATENT DOCUMENTS

JP     A 63-200916     8/1988

*Primary Examiner*—Dana Ross
(74) *Attorney, Agent, or Firm*—Oliff & Berridge, PLC

(57) ABSTRACT

A thread mill that is to be moved along a helical interpolation path while being rotated about an axis of the thread mill in a rotating direction, for forming a thread in a circumferential surface of a workpiece. The thread mill includes a cylindrical main body having (a) at least one spiral flute formed in an outer circumferential surface of the cylindrical main body, and (b) at least one cutting edge each provided by a rear-side one of widthwise opposite edges, as viewed in the rotating direction, of a corresponding one of the at least one spiral flute. Each of the at least one spiral flute extends in a direction opposite to the rotating direction as viewed in a direction away from a proximal end of the cylindrical main body toward a distal end of the cylindrical main body. Also disclosed is a method of forming the thread by using the thread mill.

7 Claims, 4 Drawing Sheets

U.S. PATENT DOCUMENTS

| | | | |
|---|---|---|---|
| 6,012,882 A * | 1/2000 | Turchan | 409/74 |
| 6,345,941 B1 * | 2/2002 | Fang et al. | 409/74 |
| 6,443,674 B1 * | 9/2002 | Jaconi | 408/1 R |
| 6,742,968 B1 * | 6/2004 | Volokh | 407/34 |
| 6,758,639 B2 * | 7/2004 | Risen, Jr. | 408/199 |
| 6,899,494 B2 * | 5/2005 | Walrath | 407/54 |
| 7,001,113 B2 * | 2/2006 | Flynn et al. | 407/54 |
| 7,134,811 B2 * | 11/2006 | Francis et al. | 407/42 |
| 7,207,752 B2 * | 4/2007 | Schulte | 408/224 |
| 2002/0168236 A1 * | 11/2002 | Slaughter | 408/1 R |
| 2003/0231934 A1 * | 12/2003 | Kienzle | 409/24 |
| 2004/0170482 A1 * | 9/2004 | Henderer et al. | 408/222 |
| 2005/0271486 A1 * | 12/2005 | Henderer et al. | 408/222 |

* cited by examiner

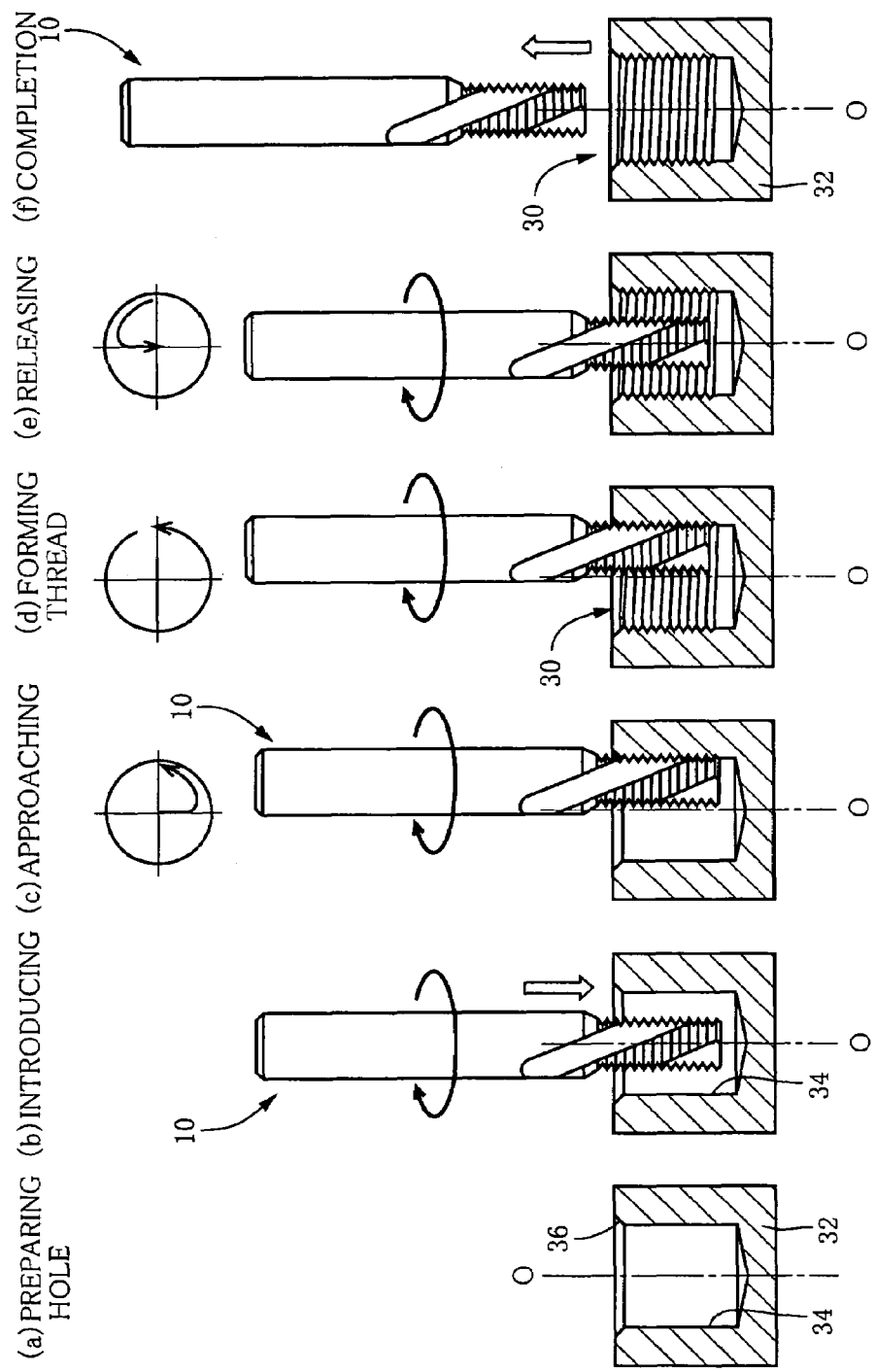

LEFT HAND SPIRAL FLUTE
(HELIX ANGLE 10°)

LEFT HAND SPIRAL FLUTE
(HELIX ANGLE 25°)

STRAIGHT FLUTE

RIGHT HAND SPIRAL FLUTE
(HELIX ANGLE 15°)

BEVELED SURFACE

FLANK

US 7,377,732 B2

THREAD MILL HAVING FLUTE TWISTING IN DIRECTION OPPOSITE TO ROTATING DIRECTION

BACKGROUND OF THE INVENTION

1. Field of the Invention

This invention relates in general to a thread mill for forming an external or internal thread in an outer or inner circumferential surface of a workpiece, and more particularly to such a thread mill that is capable of forming the thread without undesirable debris or burrs being left on the threaded circumferential surface.

2. Discussion of the Related Art

As a kind of tool for forming an internal thread in an inner circumferential surface of a hole previously formed in a workpiece, there is known a thread mill including a cylindrical main body having annular protrusions formed on its outer circumferential surface. Each of the annular protrusions has a profile of each ridge of the internal thread that is to be formed, and extends in a circumferential direction of the cylindrical main body without extending in an axial direction of the cylindrical main body for providing no lead. The cylindrical main body has flutes formed in the circumferential surface, so that each of the annular protrusion is divided by the flutes into a plurality of portions. The thread mill is attached to a machining center or other machine tool having numerically controlled three or more axes, and is moved along a helical interpolation path within the formed hole while being rotated about its axis, for machining or forming the internal thread in the circumferential surface of the formed hole, with cutting edges each provided by a rear-side one of widthwise opposite edges of a corresponding one of the flutes. An example of such a thread mill is disclosed in JP-S63-200916A (publication of unexamined Japanese Patent Application laid open in 1988). This thread mill disclosed in the Japanese publication has, in addition to the cutting edges for forming an internal thread, cutting edges provided in an axially distal end portion of a fluted main body and cutting edges provided in an axially proximal end portion of the fluted main body. The cutting edges provided in the axially distal end portion serve to form a hole having an inner circumferential surface in which the internal thread is to be formed, while the cutting edges provided in the axially proximal end portion serve to form a beveled surface in an opening edge of the hole.

In a conventional thread mill such as the thread mill disclosed in the above identified Japanese publication, each of the flutes or cutting edges twists in the same direction as a rotating direction of the tool. That is, the conventional thread mill is a right-hand cutting tool in which each flute or cutting edge twists in a clockwise direction as seen from its shank, so that chips are evacuated toward the shank when an internal thread is cut by the thread mill rotated about its axis in the clockwise direction. However, in such a conventional thread mill, a portion of each cutting edge adjacent to a rear-side (i.e., shank-side) one of flanks (hereinafter simply referred to as "rear flank") of each annular protrusion provides a negative rake rather than a positive rake, namely, provides a rake angle that is obtuse rather than acute. Therefore, the portion of each cutting edge adjacent to the rear flank of each annular protrusion cannot exhibit a satisfactory cutting performance, resulting in burrs left in an entrance opening of the hole or a chamfered portion of the formed internal thread, or burrs partially removed from the chamfered portion of the internal thread. The burrs left in the chamfered portion of the internal thread is problematic, particularly, where the thread mill has annular protrusions each having a profile configured to cut each thread ridge including its crest, namely, where the burrs are unlikely to be left in each crest in a complete thread portion of the internal thread.

FIGS. 4A and 4B are views showing, by way of example, burrs left in an internal thread, which was formed by using a thread mill which has a multiplicity of annular protrusions having a major diameter of 9.5 mm and a pitch of 1.25 mm (φ9.5 mm×P 1.25), under a cutting condition as specified below. This thread mill has right-hand spiral flutes each twists by a helix angle of 15° in a clockwise direction, which corresponds to a rotating direction of the tool as seen from its shank. FIG. 4A shows a burr left in an entrance opening of a hole or a chamfered portion of the internal thread, while FIG. 4B shows a moustache-like burr partially removed from the chamfered portion of the internal thread. Such a burr remaining in the chamfered portion of the internal thread could impede engagement of the internal thread with an external thread.

Cutting Condition
Material of workpiece: SS400
Diameter of prepared hole: φ10.8 mm
Amount of chamfering opening edge of prepared hole: C 1.5
Size of internal thread: M12×P 1.25
Cutting fluid: Water soluble coolant
Used machine: Horizontal machining center

SUMMARY OF THE INVENTION

The present invention was made in view of the background prior art discussed above. It is therefore a first object of the present invention to provide a thread mill that is capable of forming a thread without undesirable debris or burrs being left on a threaded surface. This first object may be achieved according to any one of first through sixth aspects of the invention which are described below. It is a second object of the invention is to provide a method of forming a thread by using the thread mill. This second object may be achieved according to the seventh or eighth aspect of the invention which is described below.

The first aspect of this invention provides a thread mill that is to be moved along a helical interpolation path while being rotated about an axis of the thread mill in a rotating direction, for forming a thread in a circumferential surface of a workpiece. The thread mill includes: a cylindrical main body having (a) at least one spiral flute formed in an outer circumferential surface of the cylindrical main body, and (b) at least one cutting edge each provided by a rear-side one of widthwise opposite edges, as viewed in the rotating direction, of a corresponding one of the at least one spiral flute. Each of the at least one spiral flute extends in a direction opposite to the rotating direction as viewed in a direction away from a proximal end of the cylindrical main body toward a distal end of the cylindrical main body.

According to the second aspect of the invention, in the thread mill defined in the first aspect of the invention, each of the at least one spiral flute twists by a helix angle that is not smaller than 5° and is not larger than 30°.

According to the third aspect of the invention, in the thread mill defined in the first or second aspect of the invention, the cylindrical main body has at least one annular protrusion formed on the outer circumferential surface thereof, each of the at least one annular protrusion having a profile of each ridge of the thread that is to be formed in the circumferential surface of the workpiece.

According to the fourth aspect of the invention, in the thread mill defined in the third aspect of the invention, each of the at least one annular protrusion extends in a circumferential direction of the cylindrical main body without extending in an axial direction of the cylindrical main body.

According to the fifth aspect of the invention, in the thread mill defined in the third or fourth aspect of the invention, the at least one annular protrusion consists of a plurality of annular protrusions that are arranged in an axial direction of the cylindrical main body.

According to the sixth aspect of the invention, in the thread mill defined in any one of the third through fifth aspects of the invention, a difference between a major diameter and a minor diameter of each of the at least one annular protrusion is substantially twice as large as a height of the thread that is to be formed.

The seventh aspect of the invention provides a method of forming a thread in a circumferential surface of a workpiece, by using the thread mill defined in any one of the first through sixth aspects of the invention. The method includes moving the thread mill along the helical interpolation path relative to the workpiece, while rotating the thread mill about the axis of the thread mill in the rotating direction relative to the workpiece, wherein the thread mill is moved along the helical interpolation path by causing the thread mill to orbit about an axis of the circumferential surface of the workpiece while moving the thread mill in an axial direction of the cylindrical main body.

The eighth aspect of the invention provides a method of forming a thread in a circumferential surface of a workpiece, by using the thread mill defined in any one of the first through sixth aspects of the invention. The method includes: forming a hole in the workpiece, such that the formed hole provides an inner circumferential surface as the circumferential surface of the workpiece in which an internal thread as the thread is to be formed, and such that the formed hole has a diameter larger than a diameter of the cylindrical main body; chamfering an opening edge of the hole so as to form a tapered portion in an axial end portion of the inner circumferential surface of the hole; and moving the thread mill along the helical interpolation path relative to the workpiece, while rotating the thread mill about the axis of the thread mill in the rotating direction relative to the workpiece.

The ninth aspect of the invention provides a method of forming a thread in a circumferential surface of a workpiece, by using the thread mill defined in the sixth aspect of the invention. The method includes: forming a hole in the workpiece, such that the formed hole provides an inner circumferential surface as the circumferential surface of the workpiece in which the internal thread is to be formed, and such that the formed hole has a diameter not larger than a minor diameter of the internal thread; and moving the thread mill along the helical interpolation path relative to the formed hole, while rotating the thread mill about the axis of the thread mill in the rotating direction relative to the formed hole.

In the thread mill constructed according to the invention, the at least one spiral flute defining the at least one cutting edge extends in the direction opposite to the rotating direction as seen in the direction away from the proximal end portion toward the distal end portion. Where the thread mill is designed to be rotated in a clockwise direction for forming the external or internal thread, the at least one spiral flute is arranged to twist in a counterclockwise direction. Where the thread mill is designed to be rotated in the counterclockwise direction for forming the thread, the at least one spiral flute is arranged to twist in the clockwise direction. This arrangement permits a portion of each cutting edge adjacent to a rear-side one of flanks (hereinafter simply referred to as "rear flank") of each annular protrusion provides a positive rake rather than a negative rake, namely, provides a rake angle that is acute rather than obtuse. Therefore, the portion of each cutting edge adjacent to the rear flank of each annular protrusion has an improved cutting sharpness, advantageously restraining burrs from being left in an entrance opening of the hole or a chamfered portion of the formed thread, and leading to an improvement in accuracy of the formed thread.

In the thread mill according to the second aspect of the invention, the helix angle of each of the at least one spiral flute being not smaller than 5° enables the above-described portion of each cutting edge adjacent to the rear flank of each annular protrusion to provide the rake angle that is sufficiently acute, thereby assuring the improvement of the cutting sharpness. Meanwhile, the helix angle of each of the at least one spiral flute being not larger than 30° enables the cylindrical main body to have a sufficient degree of rigidity against a load forcing the main body to be inclined.

In the thread mill according to the sixth aspect of the invention, the profile of each annular protrusion is substantially identical with the profile of each ridge of the thread that is to be formed, and the difference of the major diameter and the minor diameter of each annular protrusion is substantially twice as large as the height or depth of the thread that is to be formed. In other words, the profile of each annular protrusion is configured to enable the cutting edge to cut the entirety of each thread ridge including its crest, thereby eliminating risk of presence of the burrs left in each crest in a complete thread portion of the formed thread. Therefore, since the burrs are restrained from being left in the entrance opening of the hole, i.e., in the chamfered portion of the formed thread, as described above, it is possible to minimize presence of the burrs in the entirety of the formed thread, and accordingly to further assure the improvement of the accuracy of the formed thread.

While the thread mill constructed according to the invention is suitable, particularly, for forming an internal thread in a blind hole, the thread mill can be used also for forming an internal thread in a through-hole. Further, the thread mill can be used not only for formation of an internal thread in an inner circumferential surface of the workpiece but also for formation of an external thread in an outer circumferential surface of the workpiece. Where the internal thread is formed in the blind hole, namely, where the formed thread has the chamfered portion only in the entrance opening of the hole, rather than both in the entrance and exit openings of the hole, it is possible to enable the formed thread to be provided with an excellent accuracy, as long as the presence of the burrs in the entrance opening of the hole is retrained.

While the profile of each annular protrusion is configured to makes it possible to completely cut each thread ridge including its crest in the above-described sixth aspect of the invention, this is not essential. That is, the profile of each annular protrusion may be configured so as not to cause the thread mill to cut the crest of each thread ridge. In this case, where the at least one annular protrusion consists of the plurality of annular protrusions arranged in the axial direction, as in the fifth aspect of the invention, each of the at least one cutting edge defined by succession of the profiles of the annular protrusions may be considered to be divided into a plurality of portions that are spaced apart from each other in the axial direction. Further, in this case, where an internal thread is formed in an inner circumferential surface of a prepared hole, the crest of each thread ridge is provided by a portion of the inner circumferential surface of the prepared hole that is not cut by the thread mill.

In the thread forming method according to each of the seventh through ninth aspects of the invention in which the thread mill is moved along the helical interpolation path relative to the workpiece while being rotated about its axis relative to the workpiece, the movement of the thread mill along the helical interpolation path relative to the workpiece does not necessarily have to be made by causing only the thread mill to be moved. That is, the movement of the thread mill along the helical interpolation path relative to the workpiece may be made by causing the workpiece to be rotated about the axis of the thread mill (that is deviated from the axis of the circumferential surface of the workpiece) and to be moved in the axial direction while the thread mill is being rotated about is axis in a fixed position. It is noted that an amount of the axial movement of thread mill relative to the workpiece per each one rotation of the thread mill about the axis of the circumferential surface corresponds to an amount of lead of the thread to be formed. It is also noted that the axial movement of thread mill relative to the workpiece may be made by moving the thread mill either in its forward direction (i.e., in a direction causing the distal end of the cylindrical main body to be positioned on a forward side of the proximal end of the main body) or in its reverse direction (i.e., in a direction causing the proximal end of the cylindrical main body to be positioned on a forward side of the distal end of the main body).

In the thread forming method according to the eighth aspect of the invention in which the entrance opening edge of the hole is chamfered before the internal thread is formed in the inner circumferential surface of the hole, the thread mill constructed according to the invention can restrain burrs from being left in the chamfered portion of the internal thread. This feature eliminates necessity of implementing an additional chamfering step for removing the burrs from the formed internal thread. It is noted that the formation of the hole and the chamfering of the opening edge of the hole may be made by any cutting tool such as drill and countersink. Further, the formation of the hole and the chamfering of the opening edge of the hole does not have to be made by cutting operations but may be made by forging operations.

The number of the at least one annular protrusion formed on the outer circumferential surface of the cylindrical main body may be only one, so that the threading operation is performed by causing the thread mill to orbit about the axis of the circumferential surface of the workpiece a plural number of times. However, it is preferable that the at least one annular protrusion consists of a plurality of annular protrusions or at least three annular protrusions arranged in the axial direction, so that the thread having a predetermined length can be formed by causing the thread mill to orbit a less number of times such as only once.

The number of the at least one spiral flute formed in the outer circumferential surface of the cylindrical main body may be only one. However, it is preferable that the at least one spiral flute consists of two or more spiral flutes, so that the cylindrical main body has a plurality of cutting edges that are provided by the respective spiral flutes.

The thread mill according to the invention is made of a suitable tool material such as high speed tool steel and cemented carbide, and may be coated, as needed, with a hard coating such as TiAlN, TiN and TiCN.

BRIEF DESCRIPTION OF THE DRAWINGS

The above and other objects, features, advantages and technical and industrial significance of this invention will be better understood by reading the following detailed description of the presently preferred embodiment of the invention, when considered in connection with the accompanying drawings, in which:

FIG. 2 is a set of views showing a process of forming an internal thread by using the thread mill of FIG. 1;

DETAILED DESCRIPTION OF THE PREFERRED EMBODIMENTS

Figure 1:
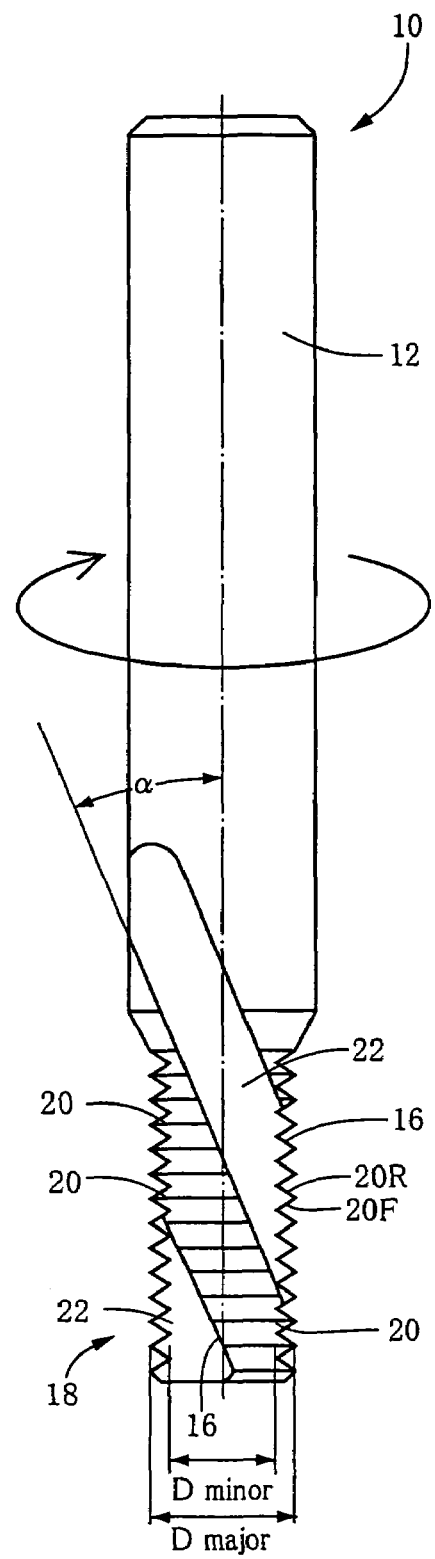
FIG. 1 is a front elevational view of a thread mill constructed according to an embodiment of this invention.

Referring first to FIG. 1, there will be described a thread mill 10 that is constructed according to an embodiment of the invention. The thread mill 10 includes: a cylindrical shank 12 that is to be attached through a suitable holder to a main spindle of a machine tool such as a machining center; and a cylindrical main body in the form of a fluted main body 18 that is coaxial and formed integrally with the shank 12. The fluted main body 18 has a multiplicity of annular protrusions 20 formed on its outer circumferential surface and arranged in axial direction of the main body 18 at a pitch between each adjacent pair of the annular protrusions 20 corresponding to a pitch of an internal thread 30 (see FIG. 2) that is to be machined by the thread mill 10. Each of the annular protrusions 20 has a profile of each ridge of the internal thread 30. Unlike a helical protrusion provided in a tap, each annular protrusion 20 of the thread mill 10 extends in a circumferential direction of the main body 18 without extending in the axial direction, for providing no lead. The fluted main body 18 further has a pair of spiral flutes 22 by which each annular protrusion 20 is divided into two portions separated from each other in the circumferential direction. A cutting edge 16 is provided by a rear-side one of widthwise opposite edges, as viewed in a rotating direction of the thread mill 10, of each of the spiral flutes 22.

In the present embodiment, the thread mill 10 is designed to be rotated in a clockwise direction as the rotating direction for machining the internal thread 30, and each spiral flute 22 is a left-hand helical flute arranged to twist in a counterclockwise direction that is opposite to the rotating direction. A helix angle $\alpha$ of each spiral flute 22 is not small than 5° and is not larger than 30°. A difference between a major diameter $D_{major}$ and a minor diameter $D_{minor}$ of each annular protrusion 20 is adapted to be substantially twice as large as a depth or height h (see FIG. 3A) of the internal thread 30, so that the cutting edge 16 serves as a profile cutting edge to cut the entirety of each thread ridge of the thread 30 including its crest (that defines a minor diameter of the thread 30), namely, so that a root located between each adjacent pair of the annular protrusions 20 serves as a portion of the cutting edge 16. The thread mill 10 is constituted by a single piece that is made in its entirety of cemented carbide, and the fluted main body 18 is cover by a hard coating made of TiAlN.

Referring next to FIG. 2, there will be described a process of machining the internal thread 30 by using the thread mill 10 constructed as described above. The process is initiated with a step of forming a hole 34 in a workpiece 32, as shown at (a) of FIG. 2, such that the formed hole 34 has a diameter which is larger than a diameter of the main body 18 of the thread mill 10 and which is slightly smaller than a minor diameter of the internal thread 30. After the formation of the hole 34, an entrance opening edge of the hole 34 is chamfered to form a tapered or beveled surface 36 in a top end portion of an inner circumferential surface of the hole 34 (see (a) of FIG. 2). In the present embodiment, the hole 34 and beveled surface 36 are machined by a cutting tool or tools (e.g., drill, countersink, and milling cutter) that is other than the thread mill 10. It is noted that the hole 34 is a blind hole having a bottom wall.

After the formation of the hole 34 and beveled surface 36, the process is continued by using the thread mill 10 that is attached to the spindle of the machining center or other machine tool having numerically controlled three or more axes. The thread mill 10 is first introduced into the hole 34 with the axis of the thread mill 10 being aligned with an axis O of the hole 34, as shown at (b) of FIG. 2. Then, the thread mill 10 is rotated about its axis and is gradually caused to bite into the inner circumferential surface of the hole 34, by causing the thread mill 10 to approach the inner circumferential with a so-called "arc in" motion over about 90°, as shown at (c) of FIG. 2. After reaching a predetermined depth of cut, the thread mill 10 is caused to orbit about the axis O of the hole 34 by 360° while being rotated about its axis, as shown at (d) of FIG. 2. In this instance, the thread mill 10 is moved by a helical interpolation. That is, the thread mill 10 is moved in the axial direction by a distance corresponding to the pitch of the annular protrusions 20, while the thread mill 10 orbits about the axis O of the hole 34 by 360°, for machining the internal thread 30. In the present embodiment, the internal thread 30, which is a right-hand thread, is machined by causing the thread mill 10 to orbit in the counterclockwise direction and to be axially moved in a reverse direction (i.e., in a direction causing the shank 12 to be positioned on a forward side of the fluted main body 18). After the thread 30 has been thus formed, the thread mill 10 is gradually released from the inner circumferential surface of the hole 34 with an "arc out" motion over 90°, and is returned to the axis O of the hole 34, as shown at (e) of FIG. 2. The process is completed by moving away from the hole 34 with the axis of the thread mill 10 being aligned with the axis O, as shown at (f) of FIG. 2.

In the thread mill 10 constructed according to the present embodiment, each of the spiral flutes 22 defining the cutting edge 16 extends in the counterclockwise direction (as viewed in a direction away from the shank 12 toward the fluted main body 18) that is opposite to the rotating direction (i.e., the clockwise direction), so that a portion of the cutting edge 16 adjacent to a rear flank 20R (see FIG. 1) of each annular protrusion 20 provides a positive rake rather than a negative rake, namely, provides a rake angle that is acute rather than obtuse, while a portion of the cutting edge 16 adjacent to a front flank 20F of each annular protrusion 20 provides a negative rake. Therefore, the portion of the cutting edge 16 adjacent to the rear flank 20R has an improved cutting sharpness, advantageously restraining burrs from being left in the beveled surface 36 or the chamfered portion of the internal thread 30. Further, since the helix angle α of each spiral flute 22 is not smaller than 5°, the above-described portion of the cutting edge 16 adjacent to the rear flank 20R can provide the rake angle that is sufficiently acute, thereby assuring the improvement of the cutting sharpness. Meanwhile, since the helix angle α of each spiral flute 22 is not larger than 30°, the main body 18 can have a sufficient degree of rigidity against to a load forcing the main body 18 to be inclined. Consequently, the thread mill 10 is capable of forming the internal thread 30 having an excellent accuracy in its entirety.

Figure 3A:
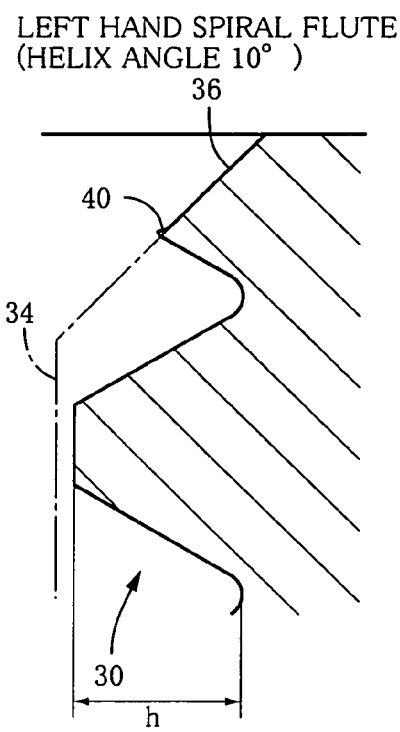
FIG. 3A is a cross sectional view showing a burr left in a chamfered portion of an internal thread formed by using a thread mill of the invention.
Figure 3B:
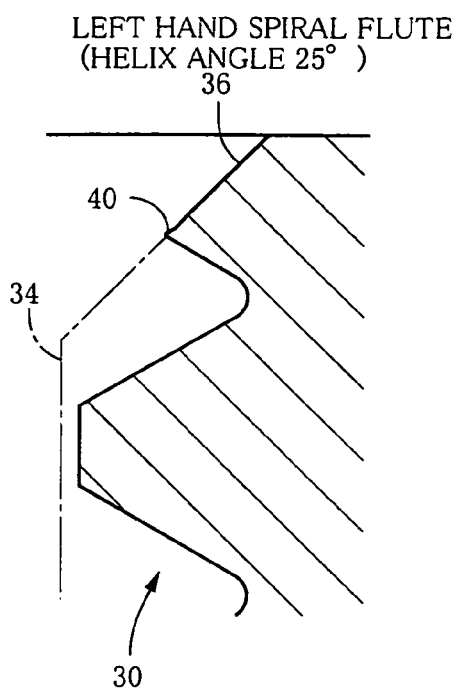
FIG. 3B is a cross sectional view showing a burr left in a chamfered portion of an internal thread formed by using another thread mill of the invention.
Figure 3C:
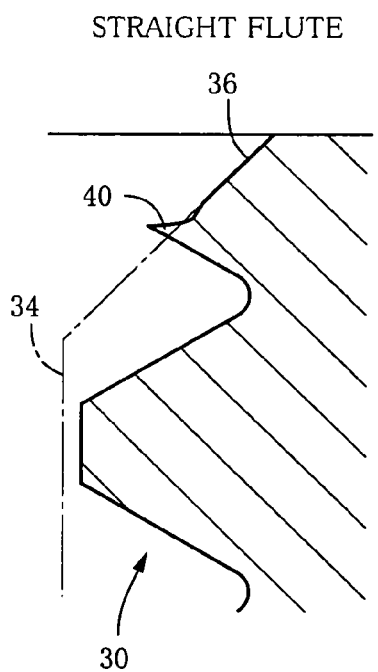
FIG. 3C is a cross sectional view showing a burr left in a chamfered portion of an internal thread formed by using a conventional thread mill.
Figure 3D:
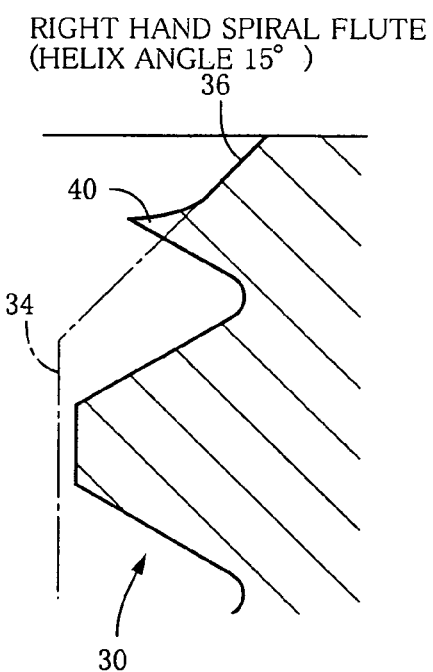
FIG. 3D is a cross sectional view showing a burr left in a chamfered portion of an internal thread formed by using another conventional thread mill.
Figure 4A:
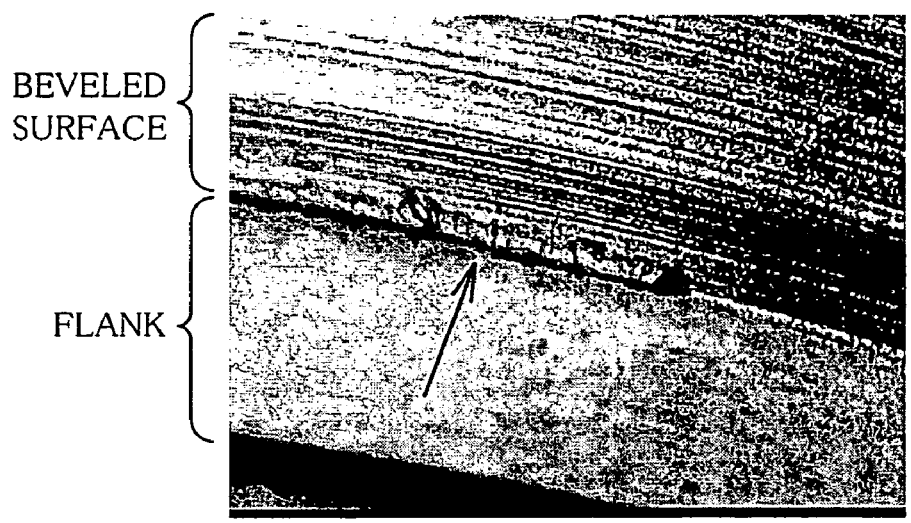
FIG. 4A is a diagram based on a photograph showing, by way of example, a burr left in a chamfered portion of a formed internal thread.
Figure 4B:
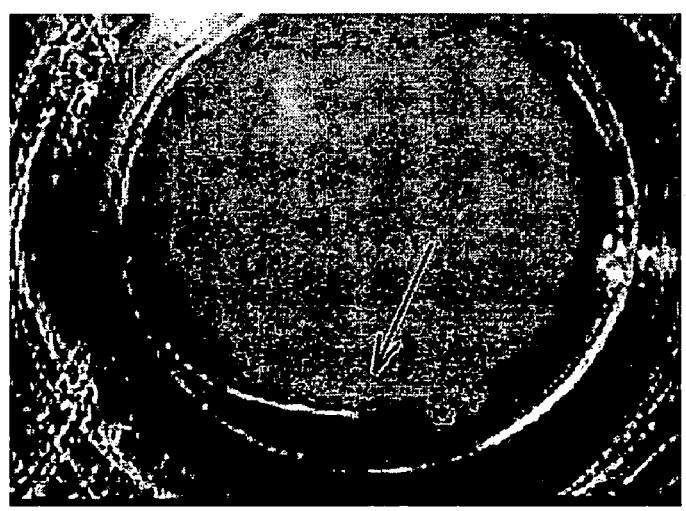
FIG. 4B is a diagram based on a photograph showing, by way of example, a moustache-like burr partially removed from the chamfered portion of the formed internal thread.

FIGS. 3A-3D show, by way of examples, a burr 40 produced in the chamfered portion of the internal thread 30 in respective cases in which the thread 30 is formed by using different thread mills all rotated in a clockwise direction. The thread mill used in the case of FIG. 3A is constructed according to the invention to have left-handed spiral flutes twisting by helix angles of 10°. The thread mill used in the case of FIG. 3B is constructed according to the invention to have left-hand spiral flutes twisting by helix angles of 25°. The thread mill used in the case of FIG. 3C has straight flutes. The thread mill used in the case of FIG. 3D has right-hand spiral flutes twisting by helix angles of 15°. As is apparent from FIGS. 3A-3D, in the cases of FIGS. 3A and 3B with use of the thread mills according to the invention, the produced burr 40 is extremely small. On the other hand, in the case of FIGS. 3C and 3D with use of the thread mills according to the prior art, the produced burr 40 is considerably larger than in the cases of FIGS. 3A and 3B, possibly impeding an engagement of the internal thread 30 with an external thread.

In the thread mill 10 of the above-described embodiment, the profile of each annular protrusion 20 is configured to enable the cutting edge 16 to serve as a profile cutting edge to cut the entirety of each thread ridge of the thread 30 including its crest, thereby eliminating risk of presence of the burrs left in each crest in a complete thread portion of the formed thread. Therefore, since the burrs are restrained from being left in the entrance opening of the hole 34, i.e., in the chamfered portion of the formed thread 30, it is possible to minimize presence of the burrs in the entirety of the formed thread 30, and accordingly to further assure the improvement of the accuracy of the formed thread 30.

In the above-described embodiment in which the internal thread 30 is machined in the blind hole 34 having the bottom wall the formed thread has the chamfered portion only in the one opening (entrance opening) of the hole 34, rather than both in two openings (entrance and exit openings) of the hole as in a case where the hole is a through-hole. It is therefore possible to enable the formed thread 30 to be provided with an excellent accuracy, as long as the presence of the burrs in the entrance opening of the hole 34 is retrained.

In the above-described embodiment, the entrance opening edge of the hole 34 is chamfered to form the beveled surface 36 in the top end portion of the inner circumferential surface of the hole 34 before the internal thread 30 is machine in the inner circumferential surface of the hole. In the threading step, the thread 30 is machined by the thread mill 10 substantially without burrs being left in the beveled surface 36 in the top end portion of the inner circumferential surface of the hole 34. Thus, it is not necessary to carry out an additional chamfering step for removing the burrs from the formed internal thread 30, leading to reduction in a cost required for the machining process.

A test was conducted by using two different thread mills each having a multiplicity of annular protrusions having a major diameter of 20 mm and a pitch of 1.5 mm (φ20 mm×P 1.5), in accordance with the process shown in FIG. 2 under a cutting condition as specified below, for checking durability of each of the two different thread mills. One of the used two thread mills was a thread mill constructed according to the invention and having left-hand spiral flutes twisting by a helix angles of 15°, while the other was a conventional thread mill having straight flutes with a helix angle of 0°. In the test, the thread mill of the invention could produce more than 5000 internal threads without any problem in engagement of each of the machined internal threads with an external thread. However, the conventional thread mill was no longer usable when about 2500 internal threads was produced. Specifically, when about 2500 internal threads have been produced by the conventional thread mill, burrs left in a chamfered portion of the internal thread were enlarged to a degree causing problem in engagement with an external thread. That is, the test revealed that the thread mill of the invention had a tool life that is about twice as long as that of the conventional thread mill having straight flutes with the helix angle of 0°.

Cutting Condition
Workpiece material: ADC12
Cutting speed (peripheral speed): 150 m/min
Diameter of prepared hole: φ28.5 mm
Size of internal thread: M30×P 1.5
Threading length: 21 mm
Cutting fluid: Water soluble coolant
Used machine: Vertical machining center While the presently preferred embodiment of the present invention has been illustrated above, it is to be understood that the invention is not limited to the details of the illustrated embodiment, but may be embodied with various changes, modifications and improvements, which may occur to those skilled in the art, without departing from the spirit and scope of the invention defined in the following claims.

What is claimed is:

1. A thread mill that is to be moved along an orbit path about an axis of a preparation hole being formed on a workpiece and having a chamfer at an opening edge while being rotated in one rotating direction about an axis of the thread mill in the preparation hole, for forming an internal thread in an inner circumferential surface of the preparation hole, said thread mill comprising:
    a cylindrical main body including (a) annular protrusions, formed on an outer circumferential surface thereof and having a profile corresponding to the internal thread to be formed on the workpiece with no lead, and (b) at least one spiral flute formed to divide the annular protrusions to provide at least one cutting edge along said spiral flute,
    wherein said spiral flute extends in a rotation direction opposite to said one rotating direction of said main body as viewed in a direction from a proximal end toward a distal end of said main body.

2. The thread mill according to claim 1, wherein said spiral flute twists by a helix angle that is not smaller than 5° and is not larger than 30°.

3. The thread mill according to claim 1, wherein a difference between a major diameter and a minor diameter of said annular protrusion is substantially twice as large as a height of the thread that is to be formed.

4. The thread mill according to claim 1, wherein said annular protrusions have a profile corresponding to the internal thread to be formed on the workpiece.

5. The thread mill according to claim 4, wherein the cutting edge of a rear flank located rearward of the main body has a rake surface of an acute angle.

6. A method of forming an internal thread in an inner circumferential surface on a preparation hole being formed on a workpiece and having a chamfer at an opening edge, by using the thread mill defined in claim 1, comprising steps of:
    forming in the workpiece the preparation hole having a diameter larger than a diameter of said main body of said thread mill;
    chamfering the opening edge of the preparation hole so as to form a tapered portion in an axial end portion of said inner circumferential surface of the preparation hole; and
    moving said thread mill along the orbit path relative to the workpiece about an axis of the preparation hole, while rotating said thread mill about said axis thereof in the one rotating direction opposite to the rotation direction in which the spiral flute extends as viewed from a proximal end toward a distal end of said main body.

7. The method of forming an internal thread according to claim 6, wherein the preparation hole on the workpiece is a blind hole having a bottom portion.

* * * * *